(12) United States Patent
Cura et al.

(10) Patent No.: US 12,227,680 B2
(45) Date of Patent: Feb. 18, 2025

(54) EXPANDABLE STRUCTURAL ADHESIVE FILM FOR DISSIMILAR METAL BONDING

(71) Applicant: 3M INNOVATIVE PROPERTIES COMPANY, St. Paul, MN (US)

(72) Inventors: Elisabeth Cura, Duesseldorf (DE); Bernhard H. Koch, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 305 days.

(21) Appl. No.: 17/762,811

(22) PCT Filed: Sep. 23, 2020

(86) PCT No.: PCT/IB2020/058881
§ 371 (c)(1),
(2) Date: Mar. 23, 2022

(87) PCT Pub. No.: WO2021/059154
PCT Pub. Date: Apr. 1, 2021

(65) Prior Publication Data
US 2022/0396716 A1  Dec. 15, 2022

(30) Foreign Application Priority Data

Sep. 27, 2019 (EP) .................................... 19200224

(51) Int. Cl.
*C09J 5/08* (2006.01)
*C09J 7/35* (2018.01)
*C09J 11/08* (2006.01)
*C09J 163/00* (2006.01)

(52) U.S. Cl.
CPC . *C09J 5/08* (2013.01); *C09J 7/35* (2018.01); *C09J 11/08* (2013.01); *C09J 163/00* (2013.01); *C09J 2301/304* (2020.08); *C09J 2301/312* (2020.08); *C09J 2301/408* (2020.08); *C09J 2400/163* (2013.01)

(58) Field of Classification Search
CPC ....... C09J 5/08; C09J 7/35; C09J 11/08; C09J 163/00; C09J 2301/304; C09J 2301/312; C09J 2301/408; C09J 2400/163; C09J 5/06; C09J 2400/24; C09J 2463/00; C08G 59/4021; C08J 2201/026; C08J 2203/22; C08J 2207/02; C08J 2363/02; C08J 2461/04; C08J 9/32; C08J 9/0061
See application file for complete search history.

(56) References Cited

U.S. PATENT DOCUMENTS

| | | |
|---|---|---|
| 6,000,118 A | 12/1999 | Biernat |
| 6,368,008 B1 | 4/2002 | Biernat |
| 6,528,176 B1 | 3/2003 | Asai |
| 9,604,676 B2 | 3/2017 | Kelley |
| 2015/0240136 A1* | 8/2015 | Elgimiabi ............ B32B 15/092 428/416 |
| 2015/0290697 A1 | 10/2015 | Koch |

FOREIGN PATENT DOCUMENTS

| | | |
|---|---|---|
| DE | 102006027231 | 12/2007 |
| EP | 0249527 | 8/1991 |
| EP | 2700683 | 2/2014 |
| WO | WO 2007-014039 | 2/2007 |
| WO | WO 2009-071269 | 6/2009 |
| WO | WO 2011-141148 | 11/2011 |
| WO | WO 2012-125995 | 9/2012 |
| WO | WO 2014-153316 | 9/2014 |
| WO | WO 2014-176512 | 10/2014 |
| WO | WO 2016-025597 | 2/2016 |

OTHER PUBLICATIONS

Bodjona et al., "Hybrid bonded-fastened joints and their application in composite structures: A general review", Journal of Reinforced Plastics and Composites, 35(9), pp. 764-781, Jan. 2016, https://journals.sagepub.com/doi/epub/10.1177/0731684415627296. (Year: 2016).*

Extended European Search Report for EP Application No. 19200224. 4, mailed on Mar. 2, 2020, 2 pages.

International Search Report for PCT International Application No. PCT/IB2020/058881, mailed on Nov. 5, 2020, 5 pages.

* cited by examiner

Primary Examiner — Christopher W Raimund
(74) Attorney, Agent, or Firm — Carlos M. Téllez Rodríguez; 3M Innovative Properties Co

(57) ABSTRACT

An expandable structural adhesive film for bonding metal parts. The adhesive film comprises at least one first epoxy compound; at least one epoxy curing agent; at least one blowing agent; at least one film-forming agent; and at least one impact modifier. The structural adhesive film exhibits an elongation at break of at least 300% according to tensile test DIN EN ISO 527 and a free expansion rate according to EN 2667-3 of at least 45%.

12 Claims, No Drawings

EXPANDABLE STRUCTURAL ADHESIVE FILM FOR DISSIMILAR METAL BONDING

CROSS REFERENCE TO RELATED APPLICATIONS

This application is a national stage filing under 35 U.S.C. 371 of PCT/IB2020/058881, filed Sep. 23, 2020, which claims the benefit of European Application No. 19200224.4, filed Sep. 27, 2019, the disclosure of which is incorporated by reference in its/their entirety herein.

TECHNICAL FIELD

The present disclosure relates to an expandable structural adhesive film for bonding metal parts. Further, the present disclosure relates to a method for making a metal panel assembly and to a metal panel assembly comprising the expandable structural adhesive film. The present disclosure also relates to certain uses of the expandable structural adhesive films.

BACKGROUND

Metal joints in vehicles may be formed through the use of an adhesive. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 discloses the use of an adhesive for securing two metal panels together. The edge of the joint is further sealed by a metal coating. WO 2009/071269 discloses an expandable epoxy paste adhesive as a sealant for a hem flange. A further hemmed structure is disclosed in U.S. Pat. No. 6,528,176.

Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039, which discloses a thermally expandable and curable epoxy-based precursor of an expanded thermoset film toughened foamed film comprising a mixture of solid and liquid epoxy resins, and claimed to provide both favorable energy absorbing properties and gap filling properties upon curing. Another partial solution has been described in WO 2011/141148, which describes a heat activated structural adhesive that is solid and dry to the touch at ambient temperature, that can be activated to develop adhesive properties at an elevated temperature and which can be moulded without curing.

Furthermore, another relevant aspect is the form of the adhesives used. For example, it is known that a lot of applications in automotive production processes are based on one-component structural bonding solutions. These products are mainly used since they do not require any mixing and may be applied in the required quantity on one of the surfaces that will be part of the later joint. Because of this, one-component adhesives are considered in at least some part of the prior art as "easy-to-use"-adhesives. For example, after applying adhesive onto a first part and subsequent positioning of the second part onto the adhesive on the first part, the parts are fixed and the adhesive is cured at elevated temperatures. In a lot of processes in automotive industry, this curing at elevated temperatures may be carried out in subsequent production steps, such as curing the paint in paint bake ovens. More recently, structural adhesives in the form of films, strips or tapes have been introduced into a number of manufacturing processes in the automotive industry. In this regard, EP 2700683 A1 discloses a structural adhesive film for bonding metal parts, in particular hem flange bonding of metal parts. The structural adhesive film is described as being particularly suitable for automated handling and application, in particular by fast robotic equipment.

Due to efforts to reduce weight of automobiles in order to save fuel and/or to enhance driving performance, lightweight materials such as aluminium are increasingly used in automotive industries. However, in combination with steel parts, this may give rise to certain additional challenges. For example, contact corrosion between steel and aluminium may be cited. In this regard, U.S. Pat. No. 9,604,676 B2 discloses curing a structural adhesive strip onto an aluminium panel before this panel is brought into contact with a steel panel in order to provide electric isolation between the steel and aluminium panel. Moreover, when joining panels of different metals together, additional problems have reported. Possibly arising from differing coefficients of thermal expansion, distortion of panels and/or partial separation of panels were encountered in heating steps during manufacture. This was especially true in baking cycles for so-called e-coated corrosion protection compositions which typically also include the curing step of adhesives that may be present between the different panels. In this regard, WO 2014/176512 A2 describes a paste adhesive which is thermally activatable to expand and fill gaps between aluminium and steel components during a paint bake operation.

For these reasons, there exists desire in industry, in particular in the automotive industry, for adhesive formulations and methods for bonding parts which allow for and adhesive compositions which allow for precise, economic and secure bonding of metal panels, such as dissimilar metal panels, during assembly and manufacture operations such as body-in-white processes.

SUMMARY

The present disclosure provides an expandable structural adhesive film for bonding metal parts, comprising at least one first epoxy compound; at least one epoxy curing agent; at least one blowing agent; at least one film-forming agent; and at least one impact modifier. In addition, the structural adhesive film exhibits an elongation at break of at least 300% according to tensile test DIN EN ISO 527, and the structural adhesive film exhibits a free expansion rate according to EN 2667-3 of at least 45%.

Furthermore, the present disclosure provides a method for making a metal panel assembly, where the method comprises:

(I) Applying the expandable structural adhesive film as described herein to a first metal panel;

(II) Applying a second metal panel onto the expandable structural adhesive film on the first metal panel, such that the expandable structural adhesive film is between the first metal panel and the second metal panel and has contact to at least one of the first and second metal panels;

(III) Optionally, applying at least one fixation through the first metal panel, the expandable structural adhesive film and the second metal panel; and (IV) Applying heat such as to expand and cure the expandable structural adhesive film, thereby adhesively connecting the first metal panel and the second metal panel.

The present disclosure also provides a metal panel assembly comprising a first metal panel and a second metal panel; and the structural adhesive film as described herein disposed between the first metal panel and the second metal panel.

Finally, the present disclosure provides a use of the expandable structural adhesive film as described herein for adhesively connecting metal panels in industrial manufacturing operations.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. It should be noted, however, that the use of "comprising" herein also encompasses the term of "consisting of", i.e. the use of "consisting of" in the sense of "consisting only of" is not excluded in the present disclosure per se.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the total amount of all ingredients gives 100% mole unless specified otherwise.

In the context of the present disclosure, the terms "room temperature" and "ambient temperature" are used interchangeably and refer to a temperature of 23° C. (±2° C.) at ambient pressure condition of about 101 kPa.

Unless explicitly stated otherwise, all embodiments and optional features of the present disclosure can be combined freely.

The first aspect of the present disclosure is an expandable structural adhesive film for bonding metal parts. The adhesive film comprises at least one first epoxy compound; at least one epoxy curing agent; at least one blowing agent; at least one film-forming agent; and at least one impact modifier. In addition, the structural adhesive film exhibits an elongation at break of at least 300% according to tensile test DIN EN ISO 527, and the structural adhesive film exhibits a free expansion rate according to EN 2667-3 of at least 45%. In some embodiments, the structural adhesive film has an unexpanded state thickness in the range of from 450 μm to 750 μm.

This expandable structural adhesive film according to the present disclose provides at least property advantageous for bonding metal parts, such as panel, in assembly and bonding operations in the automotive industry. That is, using the expandable structural adhesive film according to the present disclosure may give rise to at least one, preferably all of the following advantages: The point that the structural adhesive as described herein is a film has advantages in that it may be easily and reliably applied, and application via robotic or automated application devices may be enabled or improved. Also, strong adhesive bonds may be achieved due to the combination of ingredients (a) to (e) as comprised in the expandable structural adhesive film as described herein. Moreover, curing of the adhesive film as described herein may be easily, reliable and highly conveniently carried out in baking or curing steps already present in manufacturing lines, such as in a paint or e-coat bake oven used in present body-in-white processes in the automotive industry. Also, due to the combination of the ingredients, the adhesive film being in film-form and expandable, as well as having an elongation of break of at least 300% according to tensile test DIN EN ISO 527; and having a free expansion rate according to EN 2667-3 of at least 45%, the adhesive film as described herein is excellently suitable for use in metal panel assemblies comprising connection elements such as bolts, screws or rivets and method for their production. Therein, it was found that the expandable structural adhesives as described herein not only provide strong adhesive connection between the single panels, but may also substantially prevent or at least decrease panel distortion or "bag formation" between the panels. Also, it was found that with the adhesive filling out small gaps between the substrates to be bonded upon expansion, the low precision of panel geometries may be compensated. This is of particular advantage where relatively low precision of panel geometries may be encountered, which may be the case in automotive body shop production. Accordingly, the present disclosure provides for cleaner looking panel assemblies, more economic panel assembly methods due to higher output of acceptable panel assemblies, and faster throughput due to the possibility of quicker adhesive application.

Epoxy Resin

The epoxy resin for use herein is not particularly limited. Epoxy resins are polymers having one or more epoxy-functionality. Typically, but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake crosslinking reactions. The epoxy resins may have an average epoxy-functionality of at least 1, greater than one, or of at least 2. In a preferred aspect, the epoxy compound for use herein has an average epoxy equivalent weight of less than 250 g/equivalent, preferably of less than 230 g/equivalent, more preferably less than 220 g/equivalent, and even more preferably less than 200 g/equivalent. Preferably, the epoxy compound for use herein has an average epoxy equivalent weight comprised between 100 and 200 g/equivalent, preferably between 150 and 200 g/equivalent, more preferably between 170 and 200 g/equivalent. Preferably still, the epoxy compound for use herein has a weight average molecular weight of not more than 700 g/mol, preferably not more than 500 g/mol, more preferably not more than 400 g/mol. Advantageously, the epoxy compound for use herein has a weight average molecular weight comprised between 200 and 400 g/mol, preferably between 300 and 400 g/mol, more preferably between 350 and 400 g/mol. The epoxy compound for use herein is preferably selected from the group of epoxy compounds having an average epoxy functionality, i.e. an average number of polymerizable epoxy groups per molecule, of at least 2 and, more preferably, from 2 to 4.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol- or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenyl-methane, dihydroxydiphenylpropylenphenylmethane, dihydroxydiphenylbutylphenyl-methane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by the formula (1) wherein n denotes the repeating unit (in case of n=0 the formula below represents the diglycidyl ether of bisphenol A):

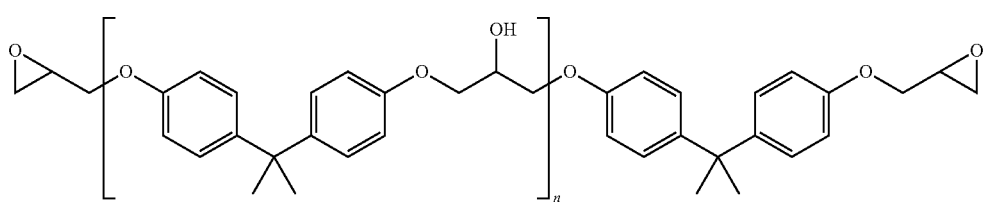

Formula (1)

Typically, the epoxy resins are blends of several resins. Accordingly, n in the formula above may represent an average value of the blend, and may not be an integer but may include values like, for example and not limited thereto, 0.1 to 2.5.

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example acyclic, linear or branched, epoxy resins may be used.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). The epoxy resins may contain halogens, preferably bromine atoms to make them less flammable. Preferably, the at least one epoxy resin is selected from phenolic epoxy resins, bisphenol epoxy resins, hydrogenated epoxy resins, aliphatic epoxy resins, halogenated bisphenol epoxy resins, novolac epoxy resins, and any combinations and mixtures thereof.

Examples of suitable and commercially available epoxy resins include diglycidylether of bisphenol A (available under the trade designation EPON 828, EPON 830, EPON 1001 or EPIKOTE 828 from Hexion Specialty Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); diglycidyl ethers of a blend of bisphenol A and bisphenol F (e.g. EPIKOTE 232 available from Momentive Specialty Chemicals, Columbus, USA). Other epoxy resins based on bisphenols are commercially available under the trade designations EPILOX (Leuna Epilox GmbH, Leuna, Germany); flame retardant epoxy resins are available under the trade designation D.E.R 580 (a brominated bisphenol type epoxy resin available from Dow Chemical Co.). Cycloaliphatic epoxy resins are commercially available under the trade designation EPINOX (Hexion Specialty Chemicals GmbH). With regard to the amount of the at least one epoxy resin in part (9) of the adhesive composition precursor as described herein, itis preferred that the at least one epoxy resin is contained in an amount in the range of from 15 to 75 wt.-%, preferably from 20 to 70 wt.-%, more preferably from 25 to 65 wt.-%, based on the total weight of based on total weight of the structural adhesive film.

Epoxy Curing Agent

The expandable structural adhesive film according to the present disclosure comprises at least one epoxy curing agent. Any epoxy curing agent, commonly known in the art, may be used in the thermosettable composition of the structural adhesive film of the invention. Suitable epoxy curing agents for use herein are materials that react with the oxirane ring of the organic epoxide to cause substantial cross-linking of the epoxide. These materials contain at least one nucleophilic or electrophilic moiety (such as an active hydrogen atom) that causes the cross-linking reaction to occur. Epoxy curing agents are distinct from epoxide chain extension agents, which primarily become lodged between chains of the organic epoxide and cause little, if any cross-linking. Epoxy curing agents as used herein are also known in the art as epoxy hardeners, epoxide hardeners, catalysts, epoxy curatives, and curatives.

Sometimes, differentiation is made between epoxy curing agents and accelerators which are used to increase the rate of the epoxide curing reaction. Accelerators typically are multifunctional materials which can also be classified as epoxy curing agents. Therefore, in the present specification, no differentiation is made between curing agents and accelerators.

Epoxy curing agents for use herein include those which are conventionally used for curing epoxy resin compositions and forming crosslinked polymer networks. Suitable epoxy curing agents may also be referred to as latent curing agents, which are typically chosen so that they do not react with the epoxy resin until the appropriate processing conditions are applied. Such compounds also include aliphatic and aromatic tertiary amines such as dimethylaminopropylamine and pyridine, which may act as catalysts to generate substantial crosslinking. Further, boron complexes, in particular boron complexes with monoethanolamine, imidazoles such as 2-ethyl-methylimidazole, guanidines such as tetramethyl guanidine, dicyanodiamide (often referred to as DICY), substituted ureas such as toluene diisocyanate urea, aliphatic ureas, or bisphenyl dimethyl urea, and acid anhydrides such as the 4-methyltetrahydroxyphthalic acid anhydride, 3-methyltetrahydroxyphthalic acid anhydride and methylnorbornenephthalic acid anhydride, may be employed. Still other useful epoxy curing agents include polyamines, mercaptans and phenols. Other epoxy curing agents for use herein include encapsulated amines, Lewis acids salts, transition metal complexes and molecular sieves. Preferably, the epoxy curing agent is selected from the group consisting of amines, acid anhydrides, guanidines, dicyandiamide and mixtures thereof. More preferably, the epoxy curing agent contains dicyandiamide. Suitable epoxy curing agents for use herein are commercially available from Air Products under tradename Amicure® CG-1200, or Dyhard 100 com Alzchem. Exemplary polyether amines suitable for use herein are commercially available under the trade designation JEFFAMINE from Huntsman Chemicals, or TTD (4,7,10-trioxatridecane-1,13-diamine) commercially available, for example, from BASF, Ludwigshafen Germany. The polyamidoamine may be branched or unbranched aromatic or branched or unbranched aliphatic. Preferably, the polyamidoamine is an aliphatic polyamidoamine. Polyamidoamines which may be advantageously used in the context of the present disclosure are obtained as described in [0010] to [0029] of EP 249527 A1, the disclosure of which is incorporated herein by reference.

The amount of epoxy curing agents in the thermosettable composition of the structural adhesive film is typically comprised between 2 and 20 wt.-%, preferably between 2 and 15 wt.-%, more preferably between 2.5 and 8 wt.-%, based on total weight of the structural adhesive film.

Blowing Agent

The expandable structural adhesive film according to the present disclosure further comprises at least one blowing agent. Any blowing agent commonly known in the art, may be used in expandable structural adhesive film as described herein. By including a blowing agent in the structural adhesive film according to the present disclosure, the structural adhesive film becomes heat expandable and may be referred to as an expandable structural adhesive film. Accordingly, by heating, for example during the heating to cause thermosetting of the adhesive sheet, the structural adhesive film expands which helps sealing any gap in the metal joint. As a result, corrosion resistance may be improved. Also, the expansion of the adhesive film ensures adhesive contact between the metal parts or metal sheets to be joined. In this regard, the adhesive contact between the metal plates may help to avoid distortion of different metal plates during heating steps commonly used in manufacturing operations in automotive industries. Accordingly, the phenomenon of so-called "bag formation" may be alleviated. The one or more blowing agents are preferably selected from the group of non-encapsulated and encapsulated blowing agents.

Non-encapsulated blowing agents, which are sometimes also referred to as chemical blowing agents, release a gaseous compound such as nitrogen, nitrogen oxide, hydrogen or carboxide dioxide during heating. Chemical blowing agents which are useful in the present invention include, for example, azobisisobutyronitriles, azodicarbonamides, carbazides, hydrazides, non-azo chemical blowing agents based on sodium borohydride or sodium bicarbonate/citric acid and dinitrosopentamethylenetetramine. The amount of the one or more chemical blowing agents is typically comprised between 0.2 and 2 wt.-%, preferably between 0.5 and 1.5 wt.-%, based on the total weight of the thermosettable composition.

Encapsulated blowing agents usually comprise liquified gases such as, for example, trichlorofluoromethane or hydrocarbons such as n-pentane, iso-pentane, neo-pentane, butane and/or iso-butane encapsulated in a polymeric thermoplastic shell. Upon heating the liquified gas expands and enlarges or blows up the thermoplastic shell like a "micro-balloon". Typically, the amount one or more encapsulated blowing agents may be advantageously comprised between from 0.5 to 10 wt.-%, preferably from 1 to 5 wt.-%, more preferably from 1 to 2 wt.-%, based on the total weight of the thermosettable composition. Encapsulated blowing agents, which are useful in the thermosettable composition, are commercially available, for example, from Pierce & Stevens Chemical Corp under the trade designation Micropearl™, from Matsumoto under the trade name Microsphere™ or from Akzo Nobel under the trade name Expancel™.

It is preferred that the amount of one or more blowing agents is selected such as to provide the structural adhesive film with a free expansion rate according to EN 2667-3 of at least 45%. Preferably, the structural adhesive film as described herein exhibits a free expansion rate according to EN 2667-3 of at least 50%, preferably of at least 55%, more preferably of at least 60%, when subjecting the structural adhesive film to a curing temperature above the activation temperature of the curing reaction.

Film-Forming Agent

The expandable structural adhesive film according to the present disclosure further comprises at least one film-forming agent. Including such a so-called film-forming agent has the effect that stable and conformable structural adhesive films, even very thin films, may be obtained. Preferably, the at least one film-forming agent is selected from thermoplastic resins. Suitable thermoplastic resins for use herein will be easily identified by those skilled in the art, in the light of the present description. Preferably, thermoplastic resins for use herein are preferably selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, and any combinations of mixtures thereof. Preferably, the at least one film-forming agent such as the at least one thermoplastic resin exhibits a $T_G$ as determined by Differential Scanning calorimetry (DSC) in the range of from 60° C. to 140° C., preferably from 70° C. to 120° C., more preferably from 85° C. to 95° C.

Suitable thermoplastic resins for use herein may be advantageously selected from the group of polyether thermoplastic resins, and preferably polyhydroxyether thermoplastic resins. In a preferred aspect, thermoplastic resins for use herein are selected from the group of polyhydroxyether thermoplastic resins, which are preferably selected from the group consisting of phenoxy resins, polyether diamine resins, polyvinylacetal resins, in particular polyvinyl butyral resins, and any combinations or mixtures thereof. Examples of suitable polyvinylacetal resins for use herein include Vinyl Chloride/Vinyl Acetate Copolymers, Carboxyl-Modified Vinyl Copolymers, and Hydroxyl-Modified Vinyl Copolymers, commercially available from Dow Chemicals. In a very preferred aspect of the invention, the thermoplastic resin for use herein is selected from the group of phenoxy resins. Suitable thermoplastic resins for use herein are commercially available from InChem Corporation under trade designation PKHP, PKHH, PKHA, PKHB, PKHC, PKFE, PKHJ, PKHM-30 or PKHM-301. The amount of the at least one film-forming agent such as the at least one thermoplastic resin in the structural adhesive composition of the expandable structural adhesive film is typically comprised between 5 and 50 wt.-%, preferably between 7 and 30 wt.-%, more preferably between 8 and 25 wt.-%, based on total weight of the structural adhesive composition.

Impact Modifier

The structural adhesive composition of the expandable structural adhesive film according to the present disclosure comprises at least one impact modifier. As commonly known in the art, the term "impact modifier" may be used interchangeably with the term "toughening agent". Using an impact modifier or toughening agent will have the effect of improved impact resistance of the cured structural adhesive film even at lower temperatures. Accordingly, cured expandable structural adhesive films comprising at least one impact modifier may exhibit higher overlap shear strengths (according to DIN EN 1465) and/or adhesive peel strengths (according to DIN EN 1464) than comparable structural adhesive films lacking the at least one impact modifier or toughening agent.

Any impact modifier or toughening agent commonly known in the art may be used in the expandable structural adhesive film according to the present disclosure. The at least one impact modifier is preferably selected from a group comprising core-shell toughening agents, CTBNs (carboxyl and/or nitrile terminated butadiene/nitrile rubbers) and high molecular weight amine terminated polytetramethylene oxide. Core-shell impact modifier which are especially preferred, usually comprise different materials in the inner core region and the outer shell region, respectively. Preferably, the core may be harder than the shell but this is not required. The shell may comprise harder material and/or the shell may be layered in its construction. Most preferably, the inner hard core component is comprised of a single and/or a plurality of organic polymers and inorganic oxides from the first, second and/or third transition series of the periodic table such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. The soft shell preferably includes modifications with functionalities such as carboxyl, hydroxyl, epoxy, cyanates, isocyanates, amino, and thiol which can react with the epoxy components of the precursor. Core-shell impact modifiers which are useful in the expandable structural adhesive film are commercially available, for example, from Rohm and Hass under the trade designation Paraloid™. CTBN toughening agents react through their carboxyl and/or nitrile functional groups with the epoxide component of the precursor during curing thereby introducing their butadiene/nitrile rubber portion as a soft, shock-absorbing segment into the epoxy network forming a hard segment. CTBN toughening agents/impact modifiers which are useful in the present disclosure are commercially available, for example, from Hanse Chemie AG, Hamburg, Germany, under the trade designation Albipox™. Similarly, a high molecular weight amine terminated polytetramethylene oxide useful in structural adhesive film as described herein is commercially available, for example, from 3M Company, St. Paul/MN, USA, under the trade designation "3M EPX™ Rubber". The amount of the at least one impact modifier in the structural adhesive composition of the expandable structural adhesive film as disclosed herein is preferably in the range of from 10 to 40 wt.-%, preferably between 10 and 30 wt.-%, more preferably between 10 and 20 wt.-%, based on total weight of the expandable structural adhesive composition.

Filler Material

Furthermore, the expandable structural adhesive film may comprise at least one filler material. Filler materials useful in adhesive compositions are known in the art and may be preferably selected from mineral fillers, silica and glass beads. Silica compounds may have the effect of giving rise to improved flow, improved workability and increased of the compositions as described herein, without sacrificing mechanical strength or resistance to water and the like of the cured coatings obtained therefrom. In this regard, it is preferred that the at least one silica compound is selected from fused silica, fumed silica, perlite, and any combinations and mixtures thereof. Silica compounds as described herein may preferably be employed in the form of silica particles. Preferably, the silica particles comprise fumed silica, preferably hydrophobically fumed silica, fused silica, amorphous silica particles, hollow silica particles, silica gels, calcium silicates, and any combinations thereof. Exemplary commercial fillers include SHIELDEX AC5 (a synthetic amorphous silica, calcium hydroxide mixture available from W.R. Grace in Columbia, MD, USA); CAB-O-SIL TS 720 (a hydrophobic fumed silica-treated with polydimethyl-siloxane-polymer available from Cabot GmbH in Hanau, Germany); AEROSIL VP-R-2935 (a hydrophobically fumed silica available from Degussa in Düsseldorf, Germany); AEROSIL R-202 (a hydrophobically fumed silica available from Evonik Industries, Germany); glass-beads class IV (250-300 microns): amorphous silica (available from 3M Deutschland GmbH in Neuss, Germany); Fusil SF 20 (available from 3M. 510 Midway, Tennessee, USA); amorphous, fused silica; and APYRAL 24 ESF (epoxysilane-functionalized (2 wt.-%) aluminium trihydrate available from Nabaltec GmbH in Schwandorf, Germany). Fused silica is available, for example, under the trade designation Fusil from 3M, USA.

The expandable structural adhesive film according to the present disclosure exhibits an elongation at break of at least 300% according to tensile test DIN EN ISO 527. Preferably, the elongation at break according to tensile test DIN EN ISO 527 527 is at least 350%, preferably at least 400%, more preferably at least 420%. This has the advantage that the adhesive films as described herein exhibit a certain elasticity, i.e. stability when being applied. In other words, application of the expandable structural adhesive films as described herein may be safely and reliably carried out by fast automated or robotic equipment. This represents a major advantage for applications in manufacturing operations on industrial scale such as in the automotive industry, where manufacturing is already highly automatized for precision and economic reasons.

Furthermore, the expandable structural adhesive film according to the present disclosure is preferred to have, in the unexpanded state, a thickness in the range of from 450 μm to 750 μm. Preferably, the expandable structural adhesive film has a thickness in the unexpanded state in the range of from 500 μm to 750 μm, more preferably from 500 μm to 700 μm. It was found films having thicknesses in these ranges were not only able to prevent the "bag formation"-phenomenon, i.e. to prevent undesirable distortion of metal panels during the baking cycle, but also gave rise to a favourable cohesive failure mode. A thinner, non-expandable film gave rise to panel distortion, i.e. visible "bags" being formed in a panel assembly of two metal panels of different metals which were additionally fixed with rivets. While bag formation did not occur in expandable films having thicknesses above the ranges according to the present disclosure, adhesion properties between the two panels were low. Moreover, thicker films also gave rise to undesirable adhesive failure modes.

It is also preferred that the expandable structural adhesive film according to the present disclosure is tacky on at least one side. That is, it preferably exhibits a certain tackiness. This has the advantage that it may be more easily and more precisely applied onto a substrate such as a metal panel. Preferably, the expandable structural adhesive film as described herein is provided with at least one liner on at least one major surface. Using liners has the advantage that the adhesive surface is protected to be influence of moisture, dust, dirt, of physical damage which would prevent use at all or at least deteriorate the adhesive properties. As liners, all liners commonly known to the skilled person for protecting adhesive films, in particular structural adhesive films may be employed. In this regard, it is understood that the thicknesses, elongation at break and free expansion values of the expandable structural adhesive films as described herein refer to the adhesive films without the at least one liner attached to it. It is also preferred that the expandable structural adhesive film as described herein, preferably with at least one liner on at least one major surface, is in the form of a roll, preferably a level-wound roll. This has the advantage that large amounts of adhesive films may be easily produced, transported, stored and shipped to customers. Moreover, the customer has the advantages of having structural adhesive films of which large quantities may be easily stored and transported on site, and also may be employed in manufacturing processes, in a particular when large quantities of adhesive films are applied by fast robotic or automated equipment. This is of particular advantage for manufacturing processes in the automotive industry.

The present disclosure further provides a method for making a metal panel assembly, with the method comprising:

(I) Applying the expandable structural adhesive film according to the present disclosure to a first metal panel;

(II) Applying a second metal panel onto the expandable structural adhesive film on the first metal panel, such that the expandable structural adhesive film is between the first metal panel and the second metal panel and has contact to at least one of first and second metal panels;

(III) Optionally, applying at least one connection device through the first metal panel, the expandable structural adhesive film and the second metal panel; and (IV) Applying heat such as to expand and cure the expandable structural adhesive film, thereby adhesively connecting the first metal panel and the second metal panel.

The method according to the present disclosure comprising the expandable structural adhesive film as described herein has the advantage that not only the adhesive can be reliably, fast and precisely applied onto the first metal panel, in particular by means of fast robotic or automated equipment, but also that due to the combination of expansion rate and thickness of the film the problematic panel distortion (i.e. "bag formation") may be alleviated or even completely avoided.

Application of the expandable structural adhesive film as described herein onto the first metal panel may be carried out by any method commonly known to the skilled person appropriate for this purpose. That is, the adhesive film may be applied manually, i.e. by a worker or craftsman. This may be advantageous when the tape needs to be applied in very minute or complex arrangements, or onto panels having overly complex shapes. However, due to the properties of the adhesive film as described herein, it is preferably applied by automated means or by fast robotic equipment. This may be achieved by a robotic application head in which the optional liner is removed from the adhesive film, which is then quickly and precisely applied onto the substrate. After that, the second metal panel is applied onto the expandable structural adhesive film on the first metal panel such that the expandable structural adhesive film is between the first metal panel and the second metal panel and has contact to at least one of first and second metal panels. That means, the expandable structural adhesive film may have contact to either or both first and second metal panels. After application of the expandable structural adhesive film onto the first metal panel and subsequent application of the second metal panel, it may occur that the expandable structural adhesive film has secure contact to only the first metal panel. Preferably, at least one connecting device is applied through the first metal panel, the expandable structural adhesive film and the second metal panel. Accordingly, the first and second metal plates are securely fixed into position, and a strong connection within the metal panel assembly may be achieved. This may be desirable for providing a strong connection between the first and second metal panels. Also, it may desirable to fixate the first and second metals into position before the adhesive as described herein is fully cured. This may be the case when the metal panel assembly is undergoing further process steps such as forming, stamping or coating, or may be transported within one manufacturing site or even from one manufacturing site to another. Preferably, the at least one connection device is selected from screws, bolts and/or rivets, of which bolts and rivets are preferred.

Heating during the curing step (IV) may be carried out by various means known to the skilled person. In particular, heating steps already present in existing assembly processes e.g. in the automotive industry may be exploited for this purpose. For instance, the curing step (IV) may take place in parallel to the curing of paint or coating in the paint bake oven used in automotive industries. Thus, it is preferred that the curing step (IV) comprises heating treatment selected from induction heating, convection heating, IR heating, ultrasonic treatment, microwave heating, laser treatment, welding treatment and/or resistive heating, joule heating, ohmic heating, and any combination therefrom. It is also preferred that wherein the curing step comprises convection heating, IR heating and/or welding treatment, preferably convection heating. Convention heating occurs, for instance, in a paint bake oven often used in the automotive industry. With regard to the temperatures applied in the curing step (IV) in the method according to the present disclosure, it is preferred that temperature is at least 150° C., preferably at least 160° C. and more preferably at least 170° C. Preferably, the temperature in the curing step (IV) is 250° C. and less, preferably 240° C. and less, and more preferably 230° C. and less. Hence, it is preferred that the temperature in the curing step (IV) is in a range of from 150 to 250° C., preferably from 160 to 240° C. and more preferably 170 to 230° C. If the expandable structural adhesive film had secure contact, i.e. on essentially all of one of its major surfaces, to the first metal panel, it expands in this heating step, contacting also the second metal panel, and fills any gaps therebetween. This has the effect that the first and second metal panels are adhesively connected. Also, the assembly is effectively sealed. Sealing in particular towards water and the like is advantageous in that an effective corrosion protection is provided. Also, the secure adhesive connection between first and second metal panels in combination with the filling of gaps between the panels has the effect that the so-called "bag formation" may be essentially avoided.

With regard to the material of the first and second metal panels, it is preferred that wherein the metal of the first and/or second metal panel is selected from steel, aluminium, magnesium, titanium, nickel, copper, and transition metals, as well as their alloys and alloys made thereof. With regard to the steel as used herein, it is noted that the present disclosure also embraces steel coated with zinc or nickel alloys. In a preferred embodiment, the metal of the first metal panel is the same as the metal of the second metal panel. In another preferred embodiment, the metal of the first metal panel is different from the metal of the second metal panel. Preferably, the metal of the first metal panel is steel, and the metal of the second metal panel is aluminium or an aluminium alloy. Similarly, it is preferred that the metal of the first metal panel is aluminium, and the metal of the second metal panel is titanium. It is also preferred that the metal of the first metal panel is steel and the metal of the second metal panel is titanium.

Due to the versatility and suitability of the method according to the present disclosure for various applications in industry, it is preferred that the method is a method in industrial manufacturing operations, preferably in automotive, commercial transportation, marine or aerospace industries, more preferably in automotive industries. In particular, so-called body-in-white or Body-shop processes in the automotive industry are embraced in the method as described herein.

The present disclosure further provides a metal panel assembly comprising a first metal panel and a second metal panel; and a structural adhesive film as described herein disposed between the first metal panel and the second metal panel.

Therein, it is understood that any metal, combination or additional items or coatings as described under the method according to the present disclosure, including preferred combinations, fully apply also to the metal panel assembly as disclosed herein. Accordingly, the metal panel assembly according to the present disclosure preferably comprises at least one connection device as disclosed in conjunction with the method as described herein through the first metal panel, the second metal panel and the structural adhesive film disposed therebetween.

Finally, the present disclosure provides a use of the expandable structural adhesive film as described herein for adhesively connecting metal panels in industrial manufacturing operations. Preferably, the industrial manufacturing operations are in automotive, commercial transportation, marine or aerospace industries, preferably in automotive industries. It is also preferred that the use is comprised in an automotive assembly line, preferably in a body-in-white process.

The present disclosure may be further exemplified by means of the following exemplary embodiments:

1. An expandable structural adhesive film for bonding metal parts, comprising
   (a) at least one first epoxy compound;
   (b) at least one epoxy curing agent;
   (c) at least one blowing agent;
   (d) at least one film-forming agent;
   (e) at least one impact modifier;
   wherein the structural adhesive film exhibits an elongation at break of at least 300% according to tensile test DIN EN ISO 527; and
   wherein the structural adhesive film exhibits a free expansion rate according to EN 2667-3 of at least 45%.

2. The structural adhesive film according to embodiment 1, wherein the structural adhesive film exhibits a free expansion rate according to EN 2667-3 of at least 50%, preferably of at least 55%, more preferably of at least 60%.

3. The structural adhesive film according to embodiment 1 or embodiment 2, wherein the elongation at break according to tensile test DIN EN ISO 527 is at least 350%, preferably at least 400%, more preferably at least 420%.

4. The structural adhesive film according to any one of the preceding embodiments, wherein the film as a thickness in the unexpanded state in the range of from 450 µm to 750 µm, 500 µm to 750 µm, more preferably from 500 µm to 700 µm.

5. The structural adhesive film according to any one of the preceding embodiments, wherein the structural adhesive film is tacky on one side.

6. The structural adhesive film according to any one of the preceding embodiments, wherein the blowing agent is selected from the group consisting of non-encapsulated and encapsulated blowing agents.

7. The structural adhesive film according to any one of the preceding embodiments, wherein the structural adhesive films contains the at least one blowing agent in an amount preferably comprised between 0.1 and 10 wt.-%, more preferably between 0.2 and 8 wt.-%, even more preferably between 0.3 and 5 wt.-%, based on the total weight of the structural adhesive film.

8. The structural adhesive film according to any one of the preceding embodiments, wherein the structural adhesive film is a thermosettable structural adhesive film.

9. The structural adhesive film according to any one of the preceding embodiments, wherein the at least one epoxy compound has an average epoxy equivalent weight of less than 250 g/equivalent, preferably less than 230 g/equivalent, more preferably less than 220 g/equivalent, even more preferably less than 200 g/equivalent.

10. The structural adhesive film according to any one of the preceding embodiments, wherein the film-forming agent is selected from thermoplastic resins.

11. The structural adhesive film according to embodiment 10, wherein the thermoplastic resin is selected from polyhydroxyethers.

12. The structural adhesive film according to embodiment 11, wherein the polyhydroxyethers are selected from phenoxy resins, polyether diamine resins, polyvinylacetal resins, and any combinations and mixtures thereof, preferably from phenoxy resins.

13. The structural adhesive film according to any one of the preceding embodiments, wherein the at least one thermoplastic resin is contained in the structural adhesive composition in an amount in the range of from 5 to 50 wt.-%, preferably from 7 to 30 wt.-%, more preferably from 8 to 25 wt.-%.

14. The structural adhesive film according to any one of the preceding embodiments, further comprising at least one filler material, preferably at least one inorganic filler material.

15. The structural adhesive film according to any one of the preceding embodiments, wherein the at least one epoxy compound has a weight average molecular weight of less than 700 g/mol, preferably less than 500 g/mol, and more preferably less than 400 g/mol.

16. The structural adhesive film according to any one of the preceding embodiments, wherein the impact modifier is selected from butadiene rubbers and core-shell impact modifiers, preferably from core-shell impact modifiers.

17. The structural adhesive film according to any one of the preceding embodiments, further comprising at least one liner on at least one major surface.

18. The structural adhesive film according to any one of the preceding embodiments, wherein the structural adhesive film is in the form of a roll, preferably of a level-wound roll.

19. A method for making a metal panel assembly, with the method comprising:
(I) Applying the expandable structural adhesive film according to any one of the preceding embodiments to a first metal panel;
(II) Applying a second metal panel onto the expandable structural adhesive film on the first metal panel, such that the expandable structural adhesive film is between the first metal panel and the second metal panel and has contact at least one of first and second metal panels;
(III) Optionally, applying screws and/or bolts through the first metal panel, the expandable structural adhesive film and the second metal panel; and
(IV) Applying heat such as to expand and cure the expandable structural adhesive film, thereby adhesively connecting the first metal panel and the second metal panel.

20. The method according to embodiment 19, wherein in step (III) screws and/or bolts are applied through the first metal panel, the expandable structural adhesive film and the second metal panel.

21. The method according to embodiment 19 or embodiment 20, wherein the metal of the first and/or second metal panel is selected from steel, aluminium, magnesium, titanium, nickel, copper, and transition metals, as well as their alloys and alloys made thereof.

22. The method according to embodiment 21, wherein the metal of the first metal panel is the same as the metal of the second metal panel.

23. The method according to embodiment 21, wherein the metal of the first metal panel is different from the metal of the second metal panel.

24. The method according to embodiment 23, wherein the metal of the first metal panel is steel, and the metal of the second metal panel is aluminium or an aluminium alloy.

25. The method according to any one of embodiments 21 to 24, wherein in step (II) the structural adhesive film has contact to the first metal panel.

26. The method according to any one of embodiments 21 to 25, wherein in step (II) the structural adhesive film has contact to the first and the second metal panel.

27. The method according to any one of embodiments 19 to 26, wherein the method is a method in industrial manufacturing operations, preferably in automotive, commercial transportation, marine or aerospace industries, more preferably in automotive industries.

28. A metal panel assembly, comprising
(i) A first metal panel and a second metal panel; and
(ii) The structural adhesive film according to any one of embodiments 1 to 18 disposed between the first metal panel and the second metal panel.

29. The metal panel according to embodiment 28, wherein the metal of the first and/or second metal panel is selected from steel, aluminium, magnesium, titanium, nickel, copper, and transition metals, as well as their alloys and alloys made thereof.

30. The metal panel assembly according to embodiment 28 or embodiment 29, wherein the metal of the first metal part and of the second metal part is the same or different.

31. The metal panel assembly according to any one of the preceding embodiments, wherein the metal of the first metal part and the second metal part is the same.

32. The metal panel assembly according to any one of embodiments 28 to 30, wherein the metal of the first metal part is different from the metal of the second metal part.

33. The metal panel assembly according to embodiment 32, wherein the metal of the first metal part is steel, and the metal of the second metal part is aluminium or an alloy of aluminium.

34. The metal panel assembly according to any one of embodiments 28 to 33, wherein the metal part assembly further comprises at least one connection device between the first metal part and the second metal part.

35. The metal panel assembly according to embodiment 34, wherein the at least one connection device is selected from screws or bolts, preferably from bolts.

36. The metal panel assembly according to embodiment 35, wherein the metal part assembly comprises a plurality of bolts securely connecting the first and second metal part.

37. The metal panel assembly according to any one of embodiments 28 to 36, obtained by curing the expandable structural adhesive film.

38. The metal panel assembly according to embodiment 37, wherein the expandable structural adhesive film has expanded, thereby filling out the space between the first metal panel and the second metal panel, and adhesively connecting the first metal panel and the second metal panel.

39. Use of the expandable structural adhesive film according to any one of embodiments 1 to 18 for adhesively connecting metal panels in industrial manufacturing operations.

40. The use of embodiment 39, wherein industrial manufacturing operations are in automotive, commercial transportation, marine or aerospace industries, preferably in automotive industries.

41. The use of embodiment 40, wherein the use is comprised in an automotive assembly line, preferably in a body-in-white process.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

TABLE 1

Materials Used.

| Material | Function | Description |
| --- | --- | --- |
| Epikote 828 | Epoxy resin | Trade designation of a liquid reaction product of epichlorohydrin and bisphenol A having an approximate epoxy equivalent weight of 184-190 grams/equivalent. Commercially available by Momentive. |
| Epon 828 | Epoxy resin | Trade designation of a solid reaction product of epichlorohydrin and bisphenol A having an approximate epoxy equivalent weight of 185-192 grams/equivalent according to ASTM D 1652. Commercially available by Resolution Performance Products. |
| D.E.R 671 | Epoxy resin | Trade designation of a solid reaction product of epichlorohydrin and bisphenol A having an approximate epoxy equivalent weight of 475-550 grams/equivalent according to ASTM D 1652. Commercially available by Dow Chemical Co. |
| Epilox A50-02 | Epoxy resin | Trade designation of a solid reaction product of epichlorohydrin and bisphenol A having an approximate epoxy equivalent weight of 450-500 grams/equivalent according to ASTM D 1652. Commercially available by Leuna Harze. |
| PK-HP 200 | Thermoplastic resin | Trade designation of a phenoxy resin. Commercially available by InChem Corporation. |
| PK-HH | Thermoplastic resin | Trade designation of a phenoxy resin. Commercially available by InChem Corporation. |
| Epodil 757 | Flexibilizing and wetting agent | Trade designation of a glycidyl ether of cyclohexane dimethanol. Commercially available by Air Products and Chemicals, Inc. |
| Paraloid 2650A | Thoughening agent | Trade designation of a core-shell toughening agent based on butadiene rubber. Commercially available by Rohm and Hass. |
| Amicure CG1200 | Primary Curative | Trade designation of 2-cyanoguanidine (dicyandiamide), available from Air Products. |
| Omicure U52M | Curative accelerator | Trade designation of 4,4 methylene bisphenyl dimethyl urea, available from CVC Speciality Chemicals, USA. |
| Micropearl F48D | Physical blowing agent | Trade designation of a thermoexpandable microcapsule produced by encapsulating volatile hydrocarbon with acrylic copolymer. Commercially available by Pierce & Stevens Chemical Corp. |
| MinSil 20 | Fused Silica | Trade designation of fused silica commercially available by Minco, Inc., USA |
| Aerosil R202 | Silica filler/ hydrophobizing agent | Trade designation of a fumed silica aftertreated with a polydimethysiloxane, available commercially by Degussa AG, Germany. |
| Eurocell 140 | Particulate filler | Trade designation of expanded perlite, commercially available by Europerl, Germany. |
| Glasperlen | Particulate spacer | Trade designation of glass beads (average grain size 90 □m), commercially available by Kominex Mineralmahlwerk, GmbH. |

Test Methods
1. Cohesive Strength (Overlap Shear Strength (OLS))

Overlap shear strength was determined according to PV 12.35. (Used substrates are based on CR5 steel hot-dip galvanized with oil according VW standard and based on Aluminum TL 094 with dry lube E1. The two-component adhesive composition was applied to one edge of the two panels (i.e., adherents). Bond area was 10 mm×25 mm per sample. Glass beads (90-150 µm in diameter) within the adhesive served as spacers. The bond was closed and the samples were cured as specified in the example.

The bonds were tested to failure in cold conditions (−35° C.+/−2° C.), at room temperature (23+/−2° C.) or at elevated temperature (80+/−2° C.) using a crosshead displacement rate of 10 mm/min. The failure load was recorded, and the lap width was measured with a vernier caliper. The quoted lap shear strengths were calculated as failure load/(measured width of the bond×measured length of the bond). The average and standard deviation were calculated from the results. The overlap shear strength (OLS) values are recorded in Mega Pascal (MPa) and are an average of the results obtained with 5 samples.

2. Tensile Test According to DIN EN ISO 527 (DIN 53 455).

Tensile Test for the determination of the elongation at break of the uncured structural adhesive film.

Sample Preparation:

The adhesive films are conditioned 24 h under normal conditions.

Strips of the adhesive film, 25 mm broad×100 mm long, are cut. Right and left sizes are protected with masking tape so that 50 mm free tape in the middle of the length is able to be measured. The masked areas permit the clamping of the sample in the tensile machine.

Sample Testing:

The test is performed on a tensile test machine, Zwick testing machine Z05, 200N measuring Head, equipped with pneumatic clamping jaws. The sample is clamped in the jaws of the tensile machine, with a gap of 50 mm, the upper jaw first, followed by the lower one. The strip is carefully vertically fixed. The testing speed is 300 mm/min. Audit End is set on Fmax drop 94%. The elongation at break of the sample is then measured.

3. Adhesive Peel Strength According to DIN EN 1464.

The Adhesive Peel strength is measured on hot dipped galvanized steel strips (commercially available by Etalon steel, reference GC 300500AA from Societee Etalon; France) having the following dimension 150 mm×25 mm×0.8 mm and coated with 3 g/m² Oil (PL 3802-39s commercially available from Fuchs Petrolub AG, Germany) according to DIN EN 1464 using a Zwick Z050 tensile tester (commercially available by Zwick GmbH & Co. KG, Ulm, Germany). The cross head speed is set for all measurements to 100 mm/min and adhesive peel strength measured at 23° C.+/−2° C. and a relative humidity of 50+/−5%. For test assembly preparation a masking tape (Scotch™ 2610 Masking Tape, commercially available from 3M, USA) is applied to a first steel strip. Hereby the masking tape is applied to visualize the bond area. The bond area has a dimension of 100 mm×25 mm. The example material to be tested is then applied to the marked bond area and covered by a second steel strip having the same dimension as the first one. The two strips are hereafter first manually pressed together and then clamped together using 2 binder clips along the bond line, in order to hold the test assembly in place. The test assemblies are cured for 30 minutes at 180° C. in an air circulating oven. Hereby the test assemblies are heated up and cooled down using 3° C./minute ramps. Test assemblies are then conditioned for 24 hours at ambient condition 23+/−2° C. and 50+/−5% relative humidity before testing. Per example material, 3 adhesive peel strength test assemblies are prepared and the test results averaged. Test results are reported in N/25 mm.

4. Failure Mode

A steel panel is joined with aluminum by a combination of an adhesive film bonding and riveting. Both metal panels are about 25 cm×6 cm and about 0.8 mm thick. The adhesive strip is applied the middle of the substrate over the length. 6 rivets are used over the length and pressed through the adhesive. The assembly is cured for 30 minutes at 180° C. in an air circulating oven. Test: the rivets are cut away and the assembly is open—majorly like a peeling—manually. The adhesive behavior in particular the failure mode and the position of the adhesive is analyzed. The samples were visually inspected by the naked eye and evaluated as follows: if the failure was completely within the adhesive layer, the failure mode was considered as "cohesive failure". However, if a failure was observed in that at least part of the adhesive layer had separated from the metal substrate, the failure mode was considered "adhesive failure". Per example material, 3 adhesive peel strength test assemblies are prepared and the test results averaged. From an application point of view, the "cohesive failure mode" is highly desirable and therefore strongly preferred.

5. Free Expansion Rate According to EN 2667-3

The free expansion rate (in %) of the expandable structural adhesive films is determined according to EN 2667-3. Test specimen are prepared by first cutting out square aluminium alloy sheets 2024-T3 in accordance with EN 2090 having the dimension of 120 mm×120 mm and a sheet thickness of 1 to 2 mm. In a next step, square adhesive films samples are cut out having the dimension of 100 mm×100 mm. The adhesive squares are then adhered to the centre of the aluminium alloy sheets. Prior to curing the uncured precursor test specimen are measured with a flat edge micrometer calliper with a precision of 0.01 mm. The precursor specimen are then cured for 30 minutes at 180° C.+/−3° C. using a heating air-circulating oven available from MPC and run at a heat-up ramp of 3° C./min. Prior to the cured thickness measurement all test specimen are stored at room temperature of 23+/−2° C. and a relative humidity of 50+/−5% until the cured specimen have returned to ambient temperature. The expansion rate is then calculated according to the following formula:

$$\text{Expansion rate } (\%) = ((\text{Thickness}_{cured} - \text{Thickness}_{uncured})/\text{Thickness}_{uncured}) \times 100$$

Preparation of Examples 1-2 and Comparative Example C-1

The epoxy-based compositions of the present invention are prepared by combining the ingredients from the list of materials of table 2 in a high speed mixer (DAC 150 FVZ Speedmixer, from Hauschild Engineering) stirring at 3000 rpm. Table 2 summarizes the compositions of examples 1 and 2 as well as of comparative example 1 (all ratios given in wt.-%).

In a first step the epoxy resins and the thermoplastic phenoxy resin and the core shell toughening agent are mixed together for 3 min. The mixture is then placed into an air driven oven at temperature of 100° C. for about 1 h. The hot mixture is again stirred for at least 2 min at 3000 rpm in the speed mixer to ensure complete dispersion of the three ingredients. Optionally, Byk-W 9010 is added. Filler materials are added to the mixture, followed by mixing for an additional 2 minutes under vacuum. Then the mixer temperature is reduced to 60° C. and the curatives together with the physical blowing agent are added and mixed for 40 seconds. The resulted mixture is a paste having a uniform consistency. By using a knife coater the mixture is hot coated to a film having thickness of 0.6 mm. The formed film is soft and homogeneous when cooled down.

TABLE 2

Compositions of examples and comparative example [wt.-%].

|  | Ex. 1 | Ex. 2 | Comp. Ex. 1 |
|---|---|---|---|
| Epoxy resin | 41 | 44.39 | 44.76 |
| Core-shell toughener | 21 | 9.81 | 9.89 |
| Thermoplastic phenoxy resin | 12 | 18.88 | 19.04 |
| Fillers | 21 | 23.07 | 23.22 |
| Curatives | 3.9 | 3.07 | 3.10 |
| Blowing Agent | 1.1 | 0.84 | none |

TABLE 3

Compositions of examples.

|  |  | Ex. 3 | Ex. 4 | Ex. 5 |
|---|---|---|---|---|
| Epikote 828 | Epoxy compounds | 44.0 | 44.0 | 44.24 |
| Paraloid EXL 2650J | Core-shell toughener | 22.81 | 22.81 | 22.94 |
| Epilox p22-00 | Epoxy compounds | 6.52 | 6.52 | 6.55 |
| PKHP-200 | Thermoplastic phenoxy resin | 8.15 | 8.15 | 8.19 |
| Shieldex AC5 | Fillers | 2.72 | 2.72 | 2.73 |
| 3M Glas bubbles S28SH | Fillers | 9.51 | 9.51 | 9.56 |
| Byk-W 9010 | Curing agent | 0.19 | 0.19 | 0.19 |
| Amicure CG 1200 | Curing agent | 3.26 | 3.26 | 3.28 |
| Dyhard UR800 | Curing agent | 1.49 | 0.00 | 0.00 |
| Omicure U52M | Curing agent | 0.00 | 1.49 | 0.96 |
| Microspheres FN 48D* | Blowing agent | 1.36 | 1.36 | 1.37 |

TABLE 4

Compositions of examples.

|  |  | Ex. 6 | Ex. 7 | Ex. 8 | Ex. 9 | Ex. 10 |
|---|---|---|---|---|---|---|
| Epikote 828 | Epoxy compounds | 35.0 | 35.1 | 35.1 | 35.1 | 37.8 |
| Paraloid EXL 2650J | Core-shell toughener | 20.4 | 20.5 | 20.5 | 20.5 | 22.1 |
| Epilox p22-00 | Epoxy compounds | 5.8 | 5.8 | 5.9 | 5.8 | 6.3 |
| PKHP-200 | Thermoplastic phenoxy resin | 11.7 | 11.7 | 11.7 | 11.7 | 12.6 |
| 3M Fused Silica 20 | Fillers | 12.2 | 12.2 | 12.2 | 12.2 | 13.1 |
| Micafort MD150 | Fillers | 7.3 | 7.3 | 7.3 | 7.3 | 0.0 |
| Shieldex AC5 | Fillers | 2.4 | 2.4 | 2.4 | 2.4 | 2.6 |
| Dyhard UR800 | Curing agent | 4.9 | 4.9 | 4.9 | 4.9 | 5.3 |
| Microspheres FN 48D* | Blowing agent | 0.2 | 0.1 | 0.0 | 0.0 | 0.0 |
| Microspheres FN-77 | Blowing agent | 0.0 | 0.0 | 0.02 | 0.1 | 0.2 |

TABLE 5

Compositions of comparative examples [wt.-%].

|  | Comp. Ex. 2 | Comp. Ex. 2 | Comp. Ex. 2 |
|---|---|---|---|
| Epikote 828 | 32.6 | 33.4 | 33.9 |
| Paraloid EXL 2650J | 19.0 | 19.5 | 19.0 |
| Eponex 1510 | 5.4 | 5.6 | 6.8 |
| PHK-200/PKHH | 0.0 | 0.0 | 8.1 |
| PKHA | 10.9 | 11.1 | 0.0 |

TABLE 5-continued

Compositions of comparative examples [wt.-%].

|  | Comp. Ex. 2 | Comp. Ex. 2 | Comp. Ex. 2 |
|---|---|---|---|
| Dyhard 100 | 2.6 | 0.0 | 2.8 |
| Dyhard 500 | 1.1 | 0.0 | 1.2 |
| Dyhard UR800 | 0.0 | 1.3 | 0.0 |
| Microspheres FN-100MD | 1.1 | 1.2 | 1.1 |
| Microspheres FN-77 | 0.0 | 0.0 | 0.0 |
| Microsphere expanded FN-80SOE | 0.0 | 0.0 | 0.0 |
| MicaFort PW30 | 9.1 | 9.3 | 13.6 |
| 3M Fused Silica | 13.6 | 13.9 | 11.3 |
| Heucophos CMP | 4.5 | 4.6 | 0.0 |
| MicaFort MD150 | 0.0 | 0.0 | 0.0 |
| Talc Luzenac 20M2 | 0.0 | 0.0 | 2.3 |
| Shieldex AC5 | 0.0 | 0.0 | 0.0 |

The failure mode was tested using adhesive strips obtained from ex. 1, ex. 2 and comp. ex. 1 in different thicknesses. The results are summarized in table 6.

TABLE 6

Failure modes.

| Sample | Adhesive film | Thickness of uncured adhesive [μm] | Thickness of assembly [mm] | Failure mode |
|---|---|---|---|---|
| 1 | Ex. 1 | 600 | 2.3 to 2.9 | cohesive |
| 2 | Ex. 2 | 600 | 2.4 to 2.8 | cohesive |
| 3 | Comp. ex. 1 | 600 | 2.3 to 2.9 | adhesive |
| 4 | Ex. 2 | 400 | 2.4 to 2.8 | adhesive |
| 5 | Ex. 2 | 850 | 2.3 to 2.9 | adhesive |

TABLE 7

Overlap shear strengths and failure mode.

|  | Comp. Ex. 1 | | Ex. 1 | |
|---|---|---|---|---|
| OLS [MPa] | 17.1 | 50% cohesive | 16.6 | cohesive |
| T-peel [N/cm] | 61 | adhesive | 54 | cohesive |

TABLE 8

Elongation at break.

|  | Ex. 1 e-break [mm] | Ex. 2 e-break [mm] |
|---|---|---|
| specimen 1 | 308 | 275.1 |
| specimen 2 | 547 | 289.3 |
| specimen 3 | 287 | 315.3 |
| specimen 4 | 438 | |
| average | 395 | 293 |
| Standard deviation | 121 | 20 |
| elongation in % (100*DL/L) | 779 | 581 |

TABLE 9

Expansion rate (curing for 30 min at 155° C.).

| Thickness in microns | Ex. 3 | Ex. 4 | Ex. 5 |
|---|---|---|---|
| Measure 1 | 0.61 | 0.608 | 0.586 |
| Measure 2 | 0.613 | 0.618 | 0.606 |
| Measure 3 | 0.591 | 0.599 | 0.582 |
| average thickness initial | 0.605 | 0.608 | 0.591 |
| Measure 1 | 0.98 | 1.108 | 1.033 |
| Measure 2 | 0.987 | 1.107 | 0.992 |
| Measure 3 | 1.027 | 1.212 | 1.057 |
| average expanded thickness | 0.998 | 1.142 | 1.027 |
| Expansion in % | 65 | 88 | 74 |

TABLE 10

Expansion rate.

| Thickness in microns | Ex. 6 | Ex. 7 | Ex. 8 | Ex. 9 | Ex. 10 |
|---|---|---|---|---|---|
| Measure 1 | 0.65 | 0.62 | 0.63 | 0.63 | 0.68 |
| Measure 2 | 0.66 | 0.62 | 0.62 | 0.62 | 0.67 |
| Measure 3 | 0.65 | 0.62 | 0.63 | 0.62 | 0.67 |
| average thickness initial | 0.65 | 0.62 | 0.63 | 0.62 | 0.67 |
| Measure 1 | 2.25 | 2.09 | 2.20 | 2.26 | 3.69 |
| Measure 2 | 1.72 | 1.41 | 1.62 | 1.65 | 3.06 |
| Measure 3 | 1.65 | 1.48 | 1.50 | 1.58 | 2.76 |
| average expanded thickness | 1.87 | 1.66 | 1.77 | 1.83 | 3.17 |
| Expansion in % | 187 | 167 | 183 | 193 | 370 |

TABLE 11

Expansion rate

| Thickness in microns | Comp. Ex. 2 | Comp. Ex. 2 | Comp. Ex. 2 |
|---|---|---|---|
| Measure 1 | 0.516 | 0.501 | 0.534 |
| Measure 2 | 0.513 | 0.500 | 0.612 |
| Measure 3 | 0.525 | 0.501 | 0.537 |
| average thickness initial | 0.518 | 0.501 | 0.561 |
| Measure 1 | 0.683 | 0.676 | 0.707 |
| Measure 2 | 0.688 | 0.642 | 0.687 |
| Measure 3 | 0.676 | 0.673 | 0.695 |
| average expanded thickness | 0.682 | 0.664 | 0.696 |
| Expansion in % | 32 | 33 | 24 |

Simulation of Bae Formation Solving: Gap Filling During Curing Process

Method: OLS with gap
Galvanic steel plates 100×25×2 mm, oiled with 3 g/m²
Spacer: PTFE parts 25×5×1 mm
Films films of examples 4, 5 and 6: 25×10×0.6 mm The films of examples 4, 5 and 6 were applied onto oily galvanic steel plates approximately 1 cm from the plate boarder. PTFE spacer were placed on both sides of the adhesive films, and the second OLS substrate is placed on the top so that the gap between the both metal substrates was 1 mm. The construction was fixed with clamps. The construction was cured in the oven at 155° C. for 30 minutes. This gap simulated the bag formation. After cooling, the OLS are measured as described in the Overlap shear test method. I.o. samples present a filled gap, strengths and both side coated metal plates

|  | A | B | C |
|---|---|---|---|
| Strengths in MPa | 5.2 | 5.2 | 3.2 |
| Failure mode | cohesive | cohesive | cohesive |

All samples were able to wet and bond the second oily substrate. The gap was filled. Strengths from several MPa could be obtained with good cohesive failure modes.

The invention claimed is:

1. An expandable structural adhesive film for bonding metal parts, comprising
    (a) at least one first epoxy compound;
    (b) at least one epoxy curing agent;
    (c) at least one blowing agent;
    (d) at least one film-forming agent;
    (e) at least one impact modifier,
    wherein the structural adhesive film exhibits an elongation at break of at least 300% according to tensile test DIN EN ISO 527, and a free expansion rate according to EN 2667-3 of at least 60%,
    wherein the film has a thickness in the unexpanded state in the range of from 450 μm to 750 μm.

2. The structural adhesive film according to claim 1, wherein the elongation at break according to tensile test DIN EN ISO 527 is at least 350%.

3. The structural adhesive film according to claim 1, wherein the film has a thickness in the unexpanded state in the range of from 500 μm to 750 μm.

4. The structural adhesive film according to claim 1, wherein the structural adhesive film is tacky on one side.

5. The structural adhesive film according to claim 1, wherein the film-forming agent is selected from thermoplastic resins.

6. The structural adhesive film according to claim 5, wherein the thermoplastic resin is selected from polyhydroxyethers and any combinations and mixtures thereof.

7. The structural adhesive film according to claim 1, further comprising at least one liner on at least one major surface.

8. A method for making a metal panel assembly, comprising the following steps
    (I) Applying the expandable structural adhesive film according to claim 1 to a first metal panel;
    (II) Applying a second metal panel onto the expandable structural adhesive film on the first metal panel, such that the expandable structural adhesive film is between the first metal panel and the second metal panel and has contact to at least one of first and second metal panels;
    (III) Optionally, applying screws and/or bolts through the first metal panel, the expandable structural adhesive film and the second metal panel; and (IV) Applying heat such as to expand and cure the expandable structural adhesive film, thereby adhesively connecting the first metal panel and the second metal panel.

9. The method according to claim 8, wherein in step (III) screws and/or bolts are applied through the first metal panel, the expandable structural adhesive film and the second metal panel.

10. A metal panel assembly, comprising
 (i) A first metal panel and a second metal panel; and
 (ii) The structural adhesive film according to claim 1 disposed between the first metal panel and the second metal panel.

11. The metal panel assembly according to claim 10, wherein the metal part assembly further comprises at least one connection device between the first metal part and the second metal part.

12. The metal panel assembly according to claim 10, wherein the expandable structural adhesive film has expanded, thereby filling out the space between the first metal panel and the second metal panel, and adhesively connecting the first metal panel and the second metal panel.

\* \* \* \* \*